United States Patent
Teboulle

(10) Patent No.: US 11,709,057 B2
(45) Date of Patent: Jul. 25, 2023

(54) METHOD AND SYSTEM FOR FINDING HANDLING TROLLEYS

(71) Applicant: SAGEMCOM ENERGY & TELECOM SAS, Rueil-Malmaison (FR)

(72) Inventor: Henri Teboulle, Rueil-Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 604 days.

(21) Appl. No.: 16/080,963

(22) PCT Filed: Mar. 13, 2017

(86) PCT No.: PCT/EP2017/055867
§ 371 (c)(1),
(2) Date: Aug. 29, 2018

(87) PCT Pub. No.: WO2017/162463
PCT Pub. Date: Sep. 28, 2017

(65) Prior Publication Data
US 2019/0025058 A1    Jan. 24, 2019

(30) Foreign Application Priority Data

Mar. 21, 2016  (FR) ...................... 1652421

(51) Int. Cl.
*G01C 21/16* (2006.01)
*G01C 25/00* (2006.01)
*G05D 1/02* (2020.01)

(52) U.S. Cl.
CPC ......... *G01C 21/183* (2020.08); *G01C 25/005* (2013.01); *G05D 1/027* (2013.01); *G05D 1/028* (2013.01); *G05D 2201/0216* (2013.01)

(58) Field of Classification Search
CPC ...... G01C 21/16; G01C 25/005; G05D 1/027; G05D 1/028; G05D 2201/0216
See application file for complete search history.

(56) References Cited

U.S. PATENT DOCUMENTS 9,145,067 B1 *  9/2015  Dahlen ...................... G01S 1/00
10,546,502 B2 *  1/2020  Carter ....................... B60T 7/12
(Continued)

FOREIGN PATENT DOCUMENTS

| FR | 3 000 542 A1 | | 7/2014 |
| GB | 1 353 374 A | | 5/1974 |
| JP | 2002132886 A | * | 5/2002 |

*Primary Examiner* — Thomas Ingram
(74) *Attorney, Agent, or Firm* — Muncy, Geissler, Olds & Lowe, P.C.

(57) ABSTRACT

System for finding at least one mobile trolley in a locale, the system including at least one communication beacon which has a range covering the locale and which is connected to a computer control unit, and at least one electronic module mounted on the trolley and including a transmission device arranged to transmit position data to the communication beacon, and an inertial motion detection hub that includes a device for detecting linear motion along axes of a detection reference system and a device for detecting angular motion about the axes of the detection reference system and that is arranged to provide position data on the basis of linear motion measurement data and angular motion measurement data, the module being mounted on an element of the trolley such that any movement of the trolley within the locale causes angular movement of the element, the system being arranged to detect when the trolley is stopped when the angular motion measurement data correspond to zero angular motion at one measurement instant and being arranged to set to zero speeds calculated on the basis of the linear motion measurement data corresponding to the same measurement instant.

14 Claims, 1 Drawing Sheet

(56) References Cited

U.S. PATENT DOCUMENTS

| | | | |
|---|---|---|---|
| 10,678,421 B2* | 6/2020 | Duteil | G06F 3/04847 |
| 2009/0262974 A1* | 10/2009 | Lithopoulos | G01C 21/206 |
| | | | 382/100 |
| 2015/0345952 A1 | 12/2015 | Chang et al. | |
| 2016/0075177 A1 | 3/2016 | Biderman et al. | |
| 2017/0113342 A1* | 4/2017 | Abramson | B25J 9/1697 |

* cited by examiner

METHOD AND SYSTEM FOR FINDING HANDLING TROLLEYS

BACKGROUND OF THE INVENTION

Field of the Invention

The present invention relates to locating handling trolleys in a premises. Such handling trolleys, which may possibly run on rails, are in widespread use for transporting goods, e.g. on industrial production sites.

Description of Related Art

Proposals have been made to locate such trolleys by means of receivers for receiving satellite positioning signals (e.g. GPS signal receivers). Nevertheless, such a solution is expensive and assumes that the premises do not include any obstacles that might oppose receiving satellite positioning signals.

Proposals have also been made to fit trolleys with telecommunications modules arranged to transmit signals to stationary telecommunications beacons arranged in the premises at predetermined positions in such a manner that, regardless of its position in the premises, each trolley is in range of a plurality of telecommunications beacons simultaneously. The position of each trolley can be determined by measuring the travel times of signals between said trolleys and a plurality of telecommunications beacons. Nevertheless, it appears to be difficult to obtain sufficiently accurate localization of trolleys by such means.

Finally, it has been envisaged to fit trolleys with relatively low cost inertial units of microelectromechanical system (MEMS) type. Such a unit comprises a linear motion detector device having accelerometers arranged on the axes of a detection reference frame. The accelerometers provide linear motion data corresponding to the acceleration of the trolley along the axes in question, and from that acceleration it is possible to determine a speed and a position for the trolley relative to the detection reference frame. The unit also has a device for detecting angular motion, which device comprises gyros arranged on the axes of the detection reference frame in order to measure the movements of the detection reference frame relative to a datum reference frame in order to convert the position coordinates of the trolley in the detection reference frame into position coordinates in the datum reference frame. Nevertheless, the accuracy of such a unit is relatively poor since it is necessary periodically to correct the positioning data it provides.

BRIEF SUMMARY OF THE INVENTION

An object of the invention is to enable trolleys in a premises to be located relatively accurately and inexpensively.

To this end, the invention provides a system for locating at least one movable trolley in a premises. The system comprises at least one communications beacon having range that covers the premises and that is connected to a control computer unit, and at least one electronic module that is on board the trolley. The onboard electronic module comprises a transmitter device arranged to transmit positioning data to the communications beacon, and an inertial motion detector unit that comprises a device for detecting linear motion along axes of a detection reference frame and a device for detecting angular motion about the axes of the detection reference frame, and that is arranged to provide positioning data on the basis of the linear motion measurement data and the angular motion measurement data. The module is mounted on an element of the trolley such that any movement of the trolley in the premises gives rise to an angular movement of the element, the system being arranged to detect that the trolley has stopped whenever the angular motion measurement data corresponds to zero angular motion at a measurement instant and then to reset to zero the speeds calculated on the basis of the linear motion measurement data corresponding to the same measurement instant.

Thus, any movement of the trolley leads to angular motion of the element and thus to angular motion of the onboard electronic module, and conversely when the trolley is stationary, the element, and thus its onboard electronic module, are likewise stationary. As a result, the angular motion detector device can be used reliably to detect movement of the trolley even if it is moving at constant speed, and also to detect any stopping of the trolley. As a result it is possible to correct errors in the linear motion detector device, thereby making the resulting position measurement more reliable.

The invention also provides a locating method, the method comprising the following steps:
  initializing the initial coordinates of the trolley relative to a local reference frame of the premises and determining an offset between the detection reference frame and the local reference frame;
  detecting movement of the trolley in the premises and determining the position of the trolley from the linear motion measurement data, the angular motion measurement data, the initial coordinates, and the offset between the local reference frame and the detection reference frame; and
  detecting that the trolley has stopped whenever the angular motion measurement data corresponds to zero angular motion at a measurement instant and then setting to zero the speeds calculated from the linear motion measurement data corresponding to the same measurement instant.

The invention also provides:
  a computer program including instructions for enabling computer server type equipment to perform the locating method;
  storage means containing such a computer program;
  a magnetic device including at least one magnetic circuit arranged to emit a magnetic field aligned on a first axis of a reference frame also having a second axis and a third axis, the magnetic device being characterized in that it is arranged to emit a magnetic field that is aligned in succession on the first axis, on the second axis, and on the third axis of the reference frame in order to perform the locating method;
  a docking base for receiving a trolley, the base including such a magnetic device; and
  an onboard electronic module for a trolley, the module including a detector device for detecting magnetic fields emitted by such a magnetic device.

Other characteristics and advantages of the invention appear on reading the following description of a particular, non-limiting embodiment of the invention.

BRIEF DESCRIPTION OF THE SEVERAL VIEWS OF THE DRAWINGS

Reference is made to the accompanying drawing, in which.

DETAILED DESCRIPTION OF THE INVENTION

Figure 1:
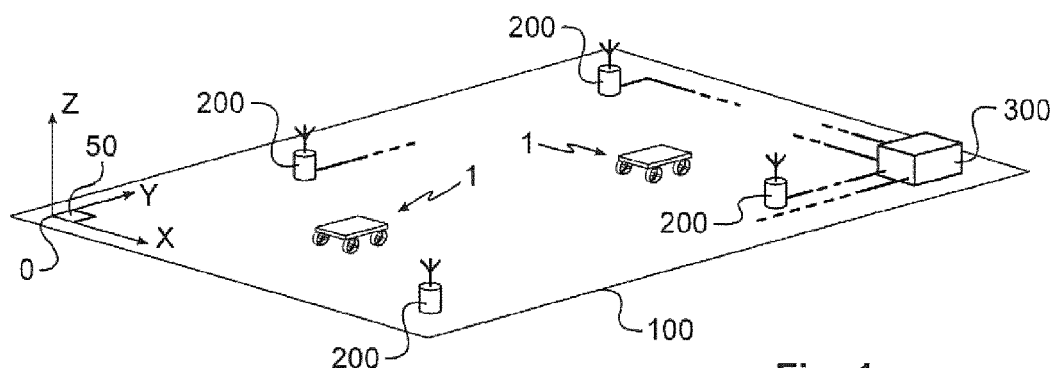
FIG. 1 is a diagrammatic perspective view of a system of the invention.
Figure 2:
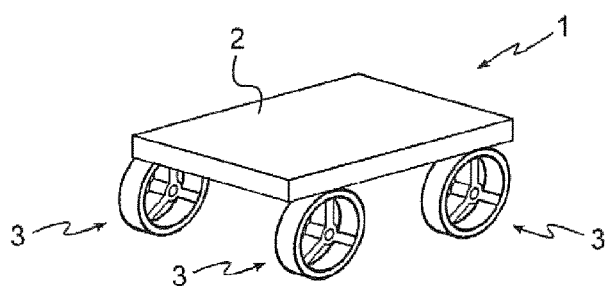
FIG. 2 is a diagrammatic perspective view of a trolley in this system.
Figure 3:
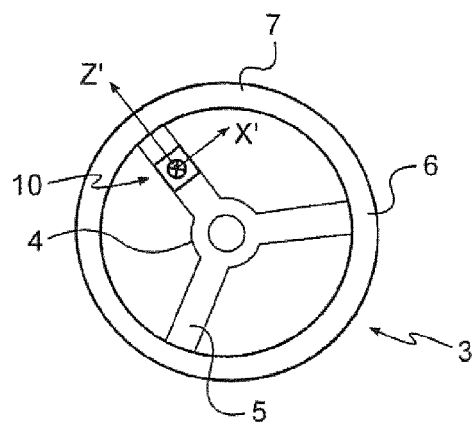
FIG. 3 is a side view of a wheel of the trolley.
Figure 4:
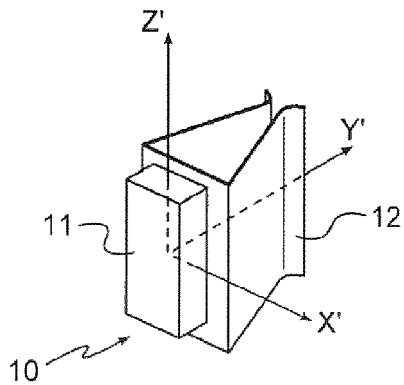
FIG. 4 is a diagrammatic perspective view of an onboard electronic module fitted to the wheel.

With reference to the figures, the invention is described below with reference to trolleys such as the "Rollis" trolley given overall reference 1, traveling in a premises 100, such as a warehouse, and fitted with a "LoRa" telecommunications network. Naturally, the invention can be used with other telecommunications networks, and for example with "LTEM" or "ZIGBEE" networks; operating in the ISM frequency band or in some other frequency band, e.g. the 434 megahertz (MHz) or the 2.4 gigahertz (GHz) frequency bands, and regardless of whether these networks are networks that are proprietary or public.

The infrastructure of the network comprises communications beacons 200 that are distributed over the premises 100 at predetermined positions of coordinates that are known (e.g. by using a receiver for satellite signals such as GPS signals). In conventional manner, the communications beacons 200 comprise transceiver means operating with the selected communications protocol and an antenna tuned to the selected communications frequency band. The communications beacons 200 are connected to a computer server 300 forming a control unit and executing a program for tracking the trolleys 1 in the premises 100. The computer server 300 has a memory storing the identifiers and the positions of the communications beacons 200 and also the identifiers and the successive positions of each of the trolleys 1. Naturally, this memory may contain the program for tracking the trolleys 1 and other information about the communications beacons 200, such as their technical characteristics, and information about the trolleys, such as their loading, their maintenance scheduling, etc.

The trolley 1 has a chassis 2 in the form of a platform with four wheels 3 mounted underneath it to rotate about horizontal axes.

Each wheel 3 has a hub 4 from which spokes 5 extend, connecting the hub 4 to a rim 6. The rim 6 has a tire band 7 thereon.

One of the spokes 5 of the wheels 3 has an onboard electronic module 10 fastened thereto. This onboard electronic module comprises an electronic unit 11 mounted on a support 12, in this example in the form of an elastically deformable metal clip that is engaged by force on said spoke 5.

The electronic unit 11 has a transmitter device, an inertial motion detection unit for detecting motion, and a battery for providing power. The transmitter device, itself known, is arranged to transmit positioning data to the communications beacons 200. The inertial motion detector unit, itself known, is made in the form of a micro-electromechanical system (MEMS) and includes a device for detecting linear motion along axes X', Y', Z' of a reference frame and a device for detecting angular motion about the axes X', Y', Z' of the reference frame relative to a datum or "Galilean" reference frame. The inertial detector unit is arranged to prepare positioning data on the basis of measurement data concerning the linear motion as supplied by the linear motion detector device and measurement data concerning the angular motion as prepared by the angular motion detector device. The linear motion detector device comprises accelerometers that are positioned to measure respective acceleration components along the axes X', Y', and Z', and the angular motion detection device comprises gyros positioned to measure angular velocities about each of the axes X', Y', and Z' of the datum reference frame. The positioning data prepared by the inertial unit on the basis of the measurement data comprises the coordinates of the inertial detector unit in a local X, Y, Z reference frame that is fixed, and as specified below in the description.

The system also has a base 50 for receiving trolleys 1 in a predetermined orientation. The base includes a device for recharging a battery on board the trolley. Recharging is performed by induction.

The base is arranged in the premises 100 at a stationary position of known GPS coordinates. This position corresponds to the origin of the local X, Y, Z reference frame of orientation relative to the datum or "Galilean" reference frame that is known. The base has means for positioning one of the trolleys 1 in a predetermined position and in a predetermined orientation. An operator must also orient its wheel 3 carrying the onboard electronic module 10 about its axis so as to bring it into a predetermined orientation. Thus, once positioned and oriented, the inertial detector unit has its detection X', Y', Z' reference frame positioned and oriented at a predetermined offset from the local X, Y, Z reference frame. This predetermined offset is represented by the following offset data: a position difference between the origin of the detection X', Y', Z' reference frame and the origin of the local X, Y, Z reference frame; an angular offset between the axes X and X'; an angular offset between the axes Y and Y'; and an angular offset between the axes Z and Z'.

The system is arranged to initialize an origin for the movements of the trolley 1 in the premises 100 when the trolley 1 is in position in the base. When one of the trolleys 1 is installed in the base 50 and charging of its battery begins, initial communication is set up between the computer server 300 and the onboard electronic module 10 of said trolley 1. The offset data is transmitted to the onboard electronic module 10 and thus to the inertial detector unit, which can determine its position relative to the local X, Y, Z reference frame and thus subsequently prepare corresponding positioning data. This initial communication is initiated by the onboard electronic module 10 via the communications beacons 200 and it continues in the same manner.

The inertial detector unit of the onboard electronic module 10 is arranged to operate periodically to calculate positioning data on the basis of: linear motion measurement data; angular motion measurement data; the offset data; and the original position. The onboard electronic module 10 is arranged to act periodically to enter into communication with the computer server 300 via the communications beacons 200 and to transmit the positioning data thereto.

Thus, when the trolley 1 is moved, the onboard electronic module periodically transmits the positioning data that is prepared progressively during its movement.

The inertial detector unit of the onboard electronic module is arranged to detect that the trolley 1 has stopped whenever the angular motion measurement data corresponds to zero angular motion at a measurement instant, and then to zero the speeds calculated on the basis of the linear motion measurement data corresponding to the same measurement instant. This makes it possible to detect errors in the accelerometers and to correct or compensate those errors so as to improve locating accuracy.

In this example, angular motion is considered as zero when the angular motion measurement data indicates motion of an amplitude that is below a predetermined threshold. This makes it possible both to avoid taking account of vibration that might give rise to oscillation of the wheel 3 of the trolley 1 on which the onboard electronic module is fastened, and also to avoid taking account of gyro error.

The method of the invention thus comprises the following steps:
- initiating initial coordinates for the trolley 1 relative to the local X, Y, Z reference frame of the premises 100 and determining an offset of the detection X', Y', Z' reference frame relative to the local X, Y, Z reference frame;
- detecting movements of the trolley 1 in the premises 100 and determining the position of the trolley 1 on the basis of the linear motion measurement data, the angular motion measurement data, the initial coordinates, and the offset between the local X, Y, Z reference frame and the detection X', Y', Z' reference frame; and
- detecting that the trolley 1 has stopped whenever the angular motion measurement data corresponds to zero angular motion at a measurement instant, and then zeroing the speeds calculated from the linear motion measurement data corresponding to the same measurement instant.

In a variant, the onboard electronic module 10 includes a magnetic field sensor and the base 50 includes a magnetic device arranged to emit a magnetic field that is put into alignment in succession with the axes X, Y, Z of the local reference frame. The onboard electronic module is arranged to determine the offset between the detection X', Y', Z' reference frame and the local X, Y, Z reference frame and to take that offset into account in the positioning data.

In a first embodiment, the magnetic device comprises a magnetic circuit that is arranged to emit a magnetic field in a given direction and that is mounted on a motor-driven steerable support that enables said direction to be put into alignment in succession with each of the three axes X, Y, and Z of the reference frame.

In a second embodiment, the magnetic device comprises a first electromagnetic circuit arranged, when powered, to emit a magnetic field aligned on the axis X, a second electromagnetic circuit arranged, when powered, to emit a magnetic field aligned on the axis Y of the reference frame, and a third electromagnetic circuit arranged, when powered, to emit a magnetic field aligned on the axis Z of the reference frame. The electromagnetic circuits are connected to a power supply circuit that enables one or another of the electromagnetic circuits to be powered selectively.

In a third embodiment combining the above two embodiments, two electromagnetic circuits are mounted on a support that is steerable about one of the axes of the reference frame, e.g. the axis Z, and the first electromagnetic circuit is arranged to emit a magnetic field aligned with the axis Z in such a manner that the magnetic field produced by the second electromagnetic circuit can be aligned on the axis X or on the axis Y by using the motor drive means of the support.

In order to initialize coordinates and angles, the trolley 1 is taken to the base 50 without it being necessary to orient the wheel 3 having the onboard electronic module 10 fastened thereto, and the method of the invention comprises the following steps:

- controlling the magnetic device to emit a magnetic field at the base 50 successively in alignment with each of the axes X, Y, and Y of the local reference frame;
- causing the magnetic field to be detected by the magnetometer of the onboard electronic module; and
- determining the offset between the detection X', Y', Z' reference frame and the local X, Y, Z reference frame and taking account of that offset when preparing positioning data.

For example, the magnetic field is emitted in the following sequence:
- one second in alignment with the axis X;
- two seconds in alignment with the axis Y; and
- three seconds in alignment with the axis Z.

The different emission durations enable the onboard electronic module 10 to identify the axes X, Y, and Z.

Naturally, the invention is not limited to the embodiment described but covers any variant coming within the ambit of the invention as defined by the claims.

In particular, the trolley may have a plurality of onboard electronic modules. Advantageously, each of the modules may be fastened on wheels in such a manner that a difference between the positions calculated by two modules triggers a maintenance operation to verify proper operation of the associated wheel.

The onboard electronic module may be fastened by any means, and preferably remains removable, for example it may be fastened by screws, bolts, clip-fastening, . . . , however it could equally well be fastened by adhesive or any other permanent fastener means.

The onboard electronic module may be fastened to an element connected to at least one rotary wheel, e.g. a disk rubbing against the wheel or a pulley connected thereto via a belt. The onboard electronic module may also be fastened to a pendulum mounted on the trolley in such a manner that any movement of the trolley starts oscillation of the pendulum.

The initial coordinates may be determined on the basis of satellite positioning signals or by any other means.

In a variant, the position of the trolley is calculated by the computer server on the basis of the linear motion measurement data and the angular motion measurement data supplied by the onboard electronic module via the communications beacons.

The communications beacon(s) may form part of the infrastructure of a network external to the premises.

The battery of the module may be outside the module or it may be incorporated therein.

The battery of the module need not be rechargeable, in which case the base does not include a charger device.

The invention claimed is:

1. A system for locating at least one movable trolley in a premises, the system comprising at least one communications beacon having range that covers the premises and that is connected to a control computer unit executing instructions for locating the at least one movable trolley in the premises, and at least one electronic module on board the trolley and comprising:
   - a transmitter arranged to transmit positioning data to the communications beacon; and
   - an inertial motion sensor configured to detect linear motion along axes of a detection reference frame and to detect angular motion about the axes of the detection reference frame,
   - wherein the inertial motion sensor is arranged to provide positioning data on the basis of linear motion measurement data and angular motion measurement data, wherein an entirety of the onboard electronic module is mounted on an element of the trolley such that any movement of the trolley in the premises gives rise to an angular movement of the element, and wherein the system is arranged to detect that the trolley has stopped whenever the angular motion measurement data corresponds to zero angular motion at a measurement instant and then to reset to zero the speeds calculated on the basis of the linear motion measurement data corresponding to the same measurement instant.

2. The system according to claim 1, wherein the trolley comprises a chassis resting on wheels and the onboard electronic module is fastened to one of the wheels.

3. The system according to claim 1, including a docking base for receiving the trolley in a predetermined orientation, the base being arranged in the premises at a known position and the system being arranged to initialize an origin for movements of the trolley in the premises when the trolley is positioned in the base.

4. The system according to claim 3, wherein the onboard electronic module includes a magnetic field sensor and the docking base includes a magnetic device arranged to emit a magnetic field that is aligned in succession on axes of a local reference frame with emissions of duration that differ on the axes of said reference frame so as to enable the onboard electronic module to identify said axes, the onboard electronic module being arranged to determine an offset between the detection reference frame and the local reference frame and to take that offset into account in the positioning data.

5. The system according to claim 3, wherein the base includes a charger device for recharging a battery integrated in the onboard electronic module.

6. A method of locating at least one trolley that is movable in a premises by means of a location system comprising at least one communications beacon having range that covers the premises and that is connected to a control computer unit executing instructions for locating the at least one movable trolley in the premises, and at least one electronic module on board the trolley and comprising:

a transmitter arranged to transmit positioning data to the communications beacon; and an inertial motion sensor configured to detect linear motion along axes of a detection reference frame and to detect angular motion about the axes of the detection reference frame, wherein the inertial motion sensor is arranged to provide positioning data on the basis of linear motion measurement data and angular motion measurement data, wherein an entirety of the onboard electronic module is mounted on an element of the trolley such that any movement of the trolley in the premises gives rise to an angular movement of the element, wherein the system being is arranged to detect that the trolley has stopped whenever the angular motion measurement data corresponds to zero angular motion at a measurement instant and then to reset to zero the speeds calculated on the basis of the linear motion measurement data corresponding to the same measurement instant, and wherein the method is implemented by the control computer unit and comprises the following steps:

initializing the initial coordinates of the trolley relative to a local reference frame of the premises and determining an offset between the detection reference frame and the local reference frame;

detecting movement of the trolley in the premises and determining the position of the trolley from the linear motion measurement data, the angular motion measurement data, the initial coordinates, and the offset between the local reference frame and the detection reference frame; and detecting that the trolley has stopped whenever the angular motion measurement data corresponds to zero angular motion at a measurement instant and then setting to zero the speeds calculated from the linear motion measurement data corresponding to the same measurement instant.

7. The method according to claim 6, wherein the angular motion is considered as being zero when the angular motion measurement data represents motion of amplitude below a predetermined threshold.

8. The method according to claim 6, wherein the initial coordinates are determined on the basis of satellite positioning signals.

9. The method according to claim 8, wherein the initial coordinates are initialized by taking the trolley to a docking base positioned at the initial coordinates.

10. The method according to claim 9, including, when the trolley is in the docking base, the steps of: the docking base emitting a magnetic field that is aligned in succession with each the axes of the local reference frame, causing this magnetic field to be detected by the onboard electronic module, determining the offset between the detection reference frame and the local reference frame, and taking the offset into account in the positioning data.

11. The method according to claim 9, wherein the offset between the local reference frame and the detection reference frame is transmitted to the onboard electronic module via the telecommunications beacon during initialization of the initial coordinates.

12. The method according to claim 6, wherein the position of the trolley is calculated by the onboard electronic module and is sent to the control unit via the communications beacon.

13. A computer program including instructions for enabling a control computer unit to perform a method of locating at least one trolley that is movable in a premises by means of a location system comprising at least one communications beacon having range that covers the premises and that is connected to the control computer unit executing instructions for locating the at least one movable trolley in the premises, and at least one electronic module on board the trolley and comprising:

a transmitter arranged to transmit positioning data to the communications beacon; and an inertial motion sensor configured to detect linear motion along axes of a detection reference frame and to detect angular motion about the axes of the detection reference frame, wherein the inertial motion sensor is arranged to provide positioning data on the basis of linear motion measurement data and angular motion measurement data, wherein an entirety of the onboard electronic module is mounted on an element of the trolley such that any movement of the trolley in the premises gives rise to an angular movement of the element, wherein the system being is arranged to detect that the trolley has stopped whenever the angular motion measurement data corresponds to zero angular motion at a measurement instant and then to reset to zero the speeds calculated on the basis of the linear motion measurement data corresponding to the same measurement instant, and wherein the method is implemented by the control computer unit and comprises the following steps:
  initializing the initial coordinates of the trolley relative to a local reference frame of the premises and determining an offset between the detection reference frame and the local reference frame;
  detecting movement of the trolley in the premises and determining the position of the trolley from the linear motion measurement data, the angular motion measurement data, the initial coordinates, and the offset between the local reference frame and the detection reference frame; and
  detecting that the trolley has stopped whenever the angular motion measurement data corresponds to zero angular motion at a measurement instant and then setting to zero the speeds calculated from the linear motion measurement data corresponding to the same measurement instant.

14. A storage means containing a computer program including instructions for enabling a control computer unit to perform a method of locating at least one trolley that is movable in a premises by means of a location system comprising at least one communications beacon having range that covers the premises and that is connected to the control computer unit executing instructions for locating the at least one movable trolley in the premises, and at least one electronic module on board the trolley and comprising:
  a transmitter arranged to transmit positioning data to the communications beacon; and
  an inertial motion sensor configured to detect linear motion along axes of a detection reference frame and to detect angular motion about the axes of the detection reference frame, wherein the inertial motion sensor is arranged to provide positioning data on the basis of linear motion measurement data and angular motion measurement data, wherein an entirety of the onboard electronic module is mounted on an element of the trolley such that any movement of the trolley in the premises gives rise to an angular movement of the element, wherein the system being is arranged to detect that the trolley has stopped whenever the angular motion measurement data corresponds to zero angular motion at a measurement instant and then to reset to zero the speeds calculated on the basis of the linear motion measurement data corresponding to the same measurement instant, and wherein the method is implemented by the control computer unit and comprises the following steps:
  initializing the initial coordinates of the trolley relative to a local reference frame of the premises and determining an offset between the detection reference frame and the local reference frame;
  detecting movement of the trolley in the premises and determining the position of the trolley from the linear motion measurement data, the angular motion measurement data, the initial coordinates, and the offset between the local reference frame and the detection reference frame; and
  detecting that the trolley has stopped whenever the angular motion measurement data corresponds to zero angular motion at a measurement instant and then setting to zero the speeds calculated from the linear motion measurement data corresponding to the same measurement instant.

* * * * *